(12) United States Patent
Ai

(10) Patent No.: US 8,213,348 B2
(45) Date of Patent: Jul. 3, 2012

(54) METHOD FOR REALIZING MBMS TDM AND THE INFORMATION TRANSMISSION METHOD THEREOF

(75) Inventor: Jianxun Ai, Shenzhen (CN)

(73) Assignee: ZTE Corporation (CN)

( * ) Notice: Subject to any disclaimer, the term of this patent is extended or adjusted under 35 U.S.C. 154(b) by 370 days.

(21) Appl. No.: 12/602,688

(22) PCT Filed: Jun. 5, 2008

(86) PCT No.: PCT/CN2008/071207
§ 371 (c)(1),
(2), (4) Date: Dec. 2, 2009

(87) PCT Pub. No.: WO2008/151552
PCT Pub. Date: Dec. 18, 2008

(65) Prior Publication Data
US 2010/0177675 A1      Jul. 15, 2010

(30) Foreign Application Priority Data
Jun. 8, 2007  (CN) .......................... 2007 1 0106170

(51) Int. Cl.
H04J 3/00           (2006.01)
(52) U.S. Cl. ......... 370/312; 370/336; 370/390; 370/432
(58) Field of Classification Search ............... 370/312, 370/390, 432, 329, 336, 337, 345
See application file for complete search history.

(56) References Cited

U.S. PATENT DOCUMENTS
2005/0195852 A1* 9/2005 Vayanos et al. ............... 370/437
2006/0067281 A1* 3/2006 Kwak et al. .................... 370/337
2006/0176871 A1* 8/2006 Rhee et al. ..................... 370/345
2006/0256807 A1 11/2006 Jung et al.
2006/0274780 A1* 12/2006 Walsh et al. ................... 370/458
2007/0054625 A1* 3/2007 Beale ............................. 455/69
2007/0066231 A1* 3/2007 Duffett-Smith et al. ... 455/67.11

(Continued)

FOREIGN PATENT DOCUMENTS
CN       1276954 A      12/2000
(Continued)

OTHER PUBLICATIONS

R2-040756—3GPP TSG RAN2 MBMS adhoc, Budapest Hungardy, Apr. 20-22, 2004, "MBMS: Requirements for the Scheduling message", Agenda Item: 4.1, Source: Samsung, Document for: Discussion and decision.

(Continued)

*Primary Examiner* — Brian D Nguyen
(74) *Attorney, Agent, or Firm* — Brooks Kushman P.C.

(57) ABSTRACT

The present invention discloses a method for implementing time division multiplexing among multimedia broadcast multicast services, comprising: if multimedia broadcast multicast services adopt a bearer type of point-to-multipoint, and channel resource is shared by time division multiplexing to transmit the services, a network side informing user equipments of configuration information of the multimedia broadcast multicast services, and sending the multimedia broadcast multicast services on the channel resource satisfying the configuration information, the configuration information comprising information of a time division multiplexing repetition period, and information of a position and amount of channel resource occupied in a time division multiplexing period; after receiving the configuration information, the user equipments receiving the multimedia broadcast multicast services on indicated channel resource.

18 Claims, 1 Drawing Sheet

U.S. PATENT DOCUMENTS

2007/0165709 A1\* 7/2007 Walker et al. .................. 375/219
2008/0049690 A1\* 2/2008 Kuchibhotla et al. ......... 370/338

FOREIGN PATENT DOCUMENTS

| CN | 1567773 A | 1/2005 |
|---|---|---|
| WO | 2004/064289 A2 | 7/2004 |

OTHER PUBLICATIONS

R2-071890—3GPP TSG-RAN WG2 Meeting #58, Kobe, Japan, Jul. 11, 2007, "Introduction of TDM scheme for MBSFN", Agenda Item: 5.10, Source: Ericsson, Document for: Discussion and Decision.

\* cited by examiner

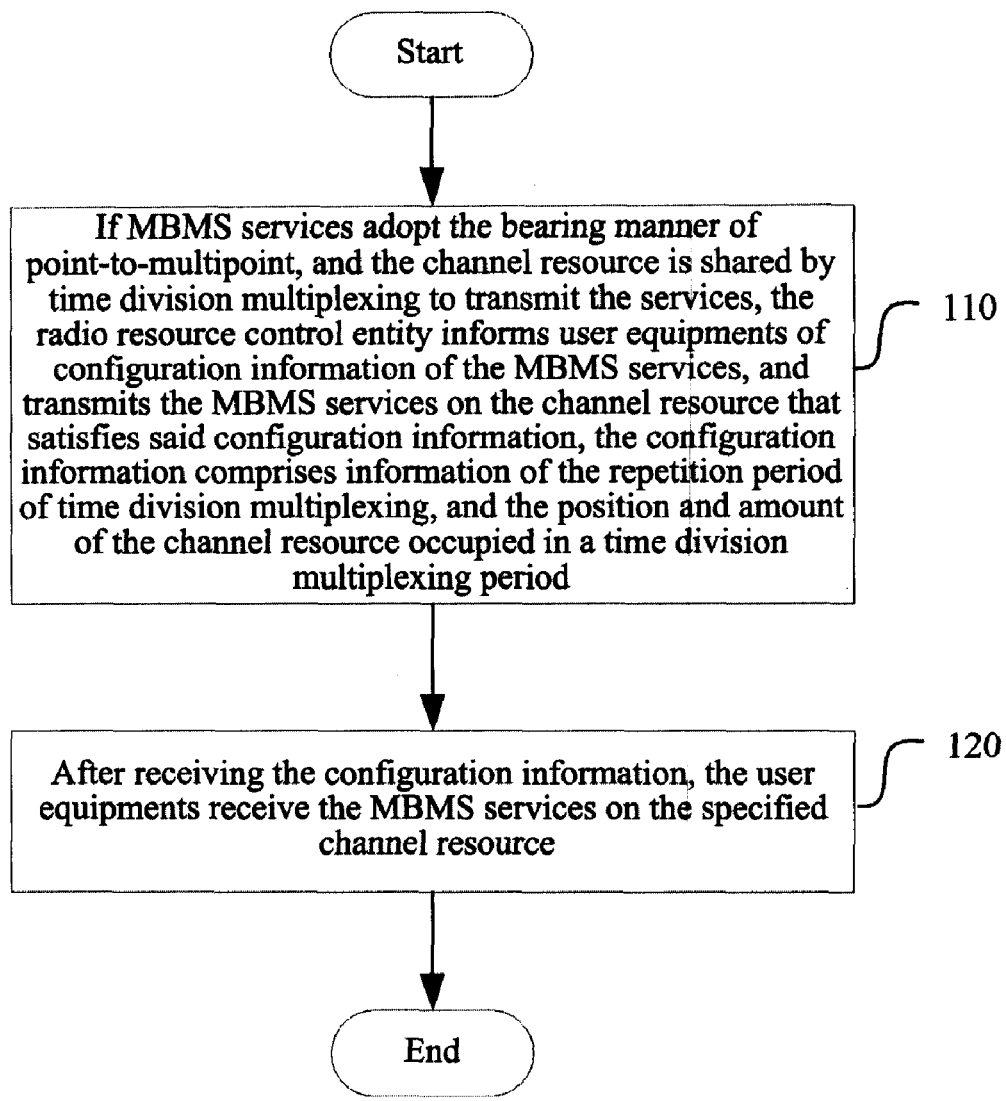

METHOD FOR REALIZING MBMS TDM AND THE INFORMATION TRANSMISSION METHOD THEREOF

TECHNICAL FIELD

The present invention relates to a $3^{rd}$ generation (3G) mobile communication system, and in particular, to a method for implementing time division multiplexing of multimedia broadcast multicast services in the third generation (3G) mobile communication system.

BACKGROUND OF THE INVENTION

With the rapid development of Internet and popularity of big screen multi-function mobile phones, plenty of mobile data multimedia services have come forth and various high bandwidth multimedia services are constantly emerging, such as video conference, television broadcast, video on demand, advertisement, online education, interactive game, and so on, which satisfies the growing service demand of mobile users on the one hand, and brings a new business growth point for mobile operators on the other hand. These mobile multimedia services require that multiple users are able to simultaneously receive the same data, which compared with general data, has characteristics such as large data amount, long duration and delay sensibility.

For effective utilization of mobile network resource, the $3^{rd}$ Generation Partnership Project (referred to as 3GPP for short) proposes the Multimedia Broadcast Multicast Service (referred to as MBMS for short) which is a technique in which data is sent from one data source to multiple targets so that the network (including the core network and access networks) resource is shared and the utilization ratio of the network resource (especially the air interface resource) is improved. The MBMS defined in the 3GPP not only can implement low-speed multicast and broadcast of plain text messages, but also can implement high-speed broadcast and multicast of multimedia services, to provide a wide variety of video, audio and multimedia services, which undoubtedly complies with the future development trend of mobile data, and provides a better business prospect for 3G development.

Configuration of a radio bearer of MBMS services can adopt bearer types such as P-T-M (Point-To-Multipoint, also abbreviated to PTM or ptm) and P-T-P (Point-To-Point, also abbreviated to PTP or ptp).

The PTM mode of a MEMS service uses the common logical channel MTCH (MBMS PTM Traffic Channel) to send data to user equipments (UE) that have joined the multicast service or are interested in the broadcast service, the term UE in this specification is generalized and includes all kinds of wireless terminals such as mobile stations (MS) in other wireless communication systems; the MTCH logical channel is mapped to the transmission channel FACH (Forward Access Channel) and sent in a radio interface via the physical channel Secondary CCPCH (Secondary Common Control Physical Channel, referred to as SCCPCH for short). The RNC (Radio Network Controller) at the system side informs UEs of configuration information associated with MBMS service configuration, such as physical channels, via the MCCH (MBMS point-to-multipoint Control Channel) channel.

Messages associated with MBMS sent on the MCCH comprise: MBMS Access Information, MBMS Common p-t-m rb Information, MBMS Current Cell p-t-m rb Information, MBMS General Information, MBMS Modified services Information, MBMS Unmodified services Information, and so on.

In current MBMS protocol, a Method for sharing physical channel resource by time division multiplexing in a PTM transmission mode is defined. In this method, multiple services are mapped to different MTCH logical channels, and different logical channels are mapped to the same or different FACH transmission channels. Different transmission channels are mapped to the same or different SCCPCH physical channels. This method defines a group of cells for each service, and the group of cells defines the time of channel occupation by the service. Different services share the channel resource by time division multiplexing. Said "share" herein may be that multiple logical channels are mapped to the same transmission channel, or multiple transmission channels are mapped to the same physical channel, and in the above two modes, different services (logical channels) are sent at different time, and there is only one service being sent at one time point. UEs receive different services at different time.

The above time division multiplexing mode is embodied in the MBSFN TDM Info List cell in the MBMS Current Cell p-t-m rb Information message. In said cell, the following parameters are defined for each MBMS service of time division multiplexing:

TDM Rep, this parameter is defined as a repetition period and is represented by the number of TTIs in the repetition period. Different services are configured with different repetition period lengths, and the parameter is configured in a relatively fixed way, that is, it is configured through the TDM Req parameter of each service. Each service occupies the resource for a certain time length in a repetition period. The resource allocation situation is consistent in different repetition periods.

TDM Offset, this parameter is defined as the initial offset time of channel resource occupation by a MBMS service in a repetition period.

The channel resource occupied by a MBMS service is defined as follows:

$$(CFN \text{ div } N) \bmod TDM\_Rep = TDM\_Offset$$

Wherein, N is the number of system frames (such as 10 ms frame) included in a TTI, said TTI (Transmission Time Interval) is the transmission time interval of the FACH transmission channel to which the MTCH service logical channel is mapped, and the value is an integral multiple of the time length of a system frame. The CFN is the connection frame number of a system frame, and each 10 ms frame transmitted on the FACH channel has a CFN, of which the value range is defined as 0 to 255. (CFN div N) is an aliquot arithmetic expression that represents rounding down. Said system frame may also be referred to as radio frame.

The original protocol may cause resource allocation difficulty in some cases.

SUMMARY OF THE INVENTION

The technical problem to be solved by the present invention is to provide a method for implementing time division multiplexing of multimedia broadcast multicast services, in order to the problem of how to improve the efficiency and flexibility of resource allocation.

In order to solve the above problem, the present invention provides a method for implementing time division multiplexing of multimedia broadcast multicast services, comprising:

if multimedia broadcast multicast services adopt a bearer type of point-to-multipoint, and channel resource is shared by time division multiplexing to transmit the services, a network side informing user equipments of configuration information of the multimedia broadcast multicast services, and sending said multimedia broadcast multicast services on the channel resource satisfying said configuration information, the configuration information comprising information of a time division multiplexing repetition period, and information of a position and amount of channel resource occupied in a time division multiplexing period;

after receiving said configuration information, said user equipments receiving said multimedia broadcast multicast services on indicated channel resource.

Wherein, said information of the position of the channel resource occupied refers to information of an offset of a transmission time interval of the channel resource occupied by said multimedia broadcast multicast service in a time division multiplexing period, and said information of the amount of the channel occupied refers to a quantity of system frames or transmission time intervals of the channel resource occupied by said multimedia broadcast multicast service in a repetition period.

Wherein, said information of the amount of the resource occupied is information of a time division multiplexing repetition length, represented by a quantity of transmission time intervals of continuous channel resource occupation by a multimedia broadcast multicast service starting from a transmission time interval corresponding to an initial offset time representing the position of the resource occupied in a time division multiplexing period, or represented by a quantity of system frames of continuous channel resource occupation starting from a system frame corresponding to the initial offset time.

Wherein, when sending said multimedia broadcast multicast services on the channel resource satisfying said configuration information, the network side schedules the multimedia broadcast multicast services for corresponding system frames according to the following formula, and accordingly, said user equipments also receive said multimedia broadcast multicast services on the system frames satisfying the following equation:

$$(\text{CFN div } N) \bmod \text{TDM\_Rep} = \text{TDM\_Offset} + i, \ i=0 \text{ to TDM\_Length}-1$$

wherein,

CFN is a connection frame number of a system frame;

N is a length of a transmission time interval of a transmission channel bearing the multimedia broadcast multicast services, that is, a quantity of system frames included in a transmission time interval;

(CFN div N) is an aliquot arithmetic expression, representing rounding down;

TDM_Rep is information of a length of said repetition period;

TDM_Offset is said initial offset time, that is, the information of the position of the resource occupied by said multimedia broadcast multicast service in a repetition period;

TDM_Length is information of a quantity of transmission time intervals continuously occupied by said multimedia broadcast multicast service in a repetition period, and also the information of the amount of the channel resource occupied by said multimedia broadcast multicast service.

Wherein, said information of the position and amount of the resource occupied is represented by a time division multiplexing offset bitmap, and a bit of said time division multiplexing offset bitmap corresponds to a transmission time interval in a time division multiplexing repetition period, and a value of the bit represents whether said multimedia broadcast multicast service occupies the transmission time interval corresponding to the bit, and positions of the bits in said bitmap correspond to initial offset times of corresponding transmission time intervals in the repetition period one to one.

Wherein, when sending said multimedia broadcast multicast services on the channel resource satisfying said configuration information, the network side schedules the multimedia broadcast multicast services for corresponding system frames according to the following formula, and accordingly, said user equipments also receive said multimedia broadcast multicast services on the system frames satisfying the following equation:

$$(\text{CFN div } N) \bmod \text{TDM\_Rep} = \text{TDM\_Offset}, i$$

wherein,

CFN is a connection frame number of a system frame;

N is a length of a transmission time interval of a transmission channel bearing the multimedia broadcast multicast services, that is, a quantity of system frames included in a transmission time interval;

(CFN div N) is an aliquot arithmetic expression, representing rounding down;

TDM_Rep is information of a length of the repetition period;

TDM_Offset,i represents an offset value of an $i^{th}$ transmission time interval occupied by said multimedia broadcast multicast service in a repetition period, and a value of i is determined by a position of a bit set to a value representing an occupied status in the time division multiplexing offset bitmap.

Wherein, said information of the position and amount of the resource occupied is represented by a list of time division multiplexing offsets, and one or more entries of time division multiplexing offsets are included in the list, and said multimedia broadcast multicast service occupies transmission time intervals corresponding to values in all the entries in the list in a time division multiplexing repetition period.

Wherein, when sending said multimedia broadcast multicast services on the channel resource satisfying said configuration information, the network side schedules the multimedia broadcast multicast services for corresponding system frames according to the following formula, and accordingly, said user equipments also receive said multimedia broadcast multicast services on the system frames satisfying the following equation:

$$(\text{CFN div } N) \bmod \text{TDM\_Rep} = \text{TDM\_Offset}, i$$

wherein,

CFN is a connection frame number of a system frame;

N is a length of a transmission time interval of a transmission channel bearing the multimedia broadcast multicast services, that is, a quantity of system frames included in a transmission time interval;

(CFN div N) is an aliquot arithmetic expression, representing rounding down;

TDM_Rep is information of a length of the repetition period;

TDM_Offset,i represents a value of an $i^{th}$ entry in the list of time division multiplexing offsets of said multimedia broadcast multicast service.

Wherein, by default, said information of the amount of the channel occupied indicates that time of channel resource occupation by a multimedia broadcast multicast service in a time division multiplexing period is one transmission time interval.

Wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

Wherein, if a plurality of multimedia broadcast multicast services share the channel resource by time division multiplexing, in a time division multiplexing repetition period, the channel resource occupied by a multimedia broadcast multicast service with a higher rate is more or equal to the channel resource occupied by a multimedia broadcast multicast service with a lower rate.

In order to solve the above problem, the present invention further provides a method for transmitting time division multiplexing information in multimedia broadcast multicast services, if a network side adopts a bearer type of point-to-multipoint and transmits the multimedia broadcast multicast services by sharing channel resource with time division multiplexing, configuration information of said multimedia broadcast multicast service sent to user equipments comprising information of a time division multiplexing repetition period, information of a position of channel resource occupied in a time division multiplexing period, and information of an amount of the channel resource occupied in a time division multiplexing period.

Wherein, a radio network controller of said network side informs the user equipments of the configuration information of said multimedia broadcast multicast service through a channel message of a Multimedia Broadcast Multicast Service point-to-multipoint control channel.

Wherein, after receiving said configuration information, said user equipments receive said multimedia broadcast multicast service on indicated channel resource.

Wherein, the information of the amount of the resource occupied and the information of the position of the resource occupied in said configuration information are represented in one of the following modes:

said information of the position of the resource occupied is represented by an initial offset time, and said information of the amount of the resource occupied is represented by a time division multiplexing repetition length, that is, represented by a quantity of transmission time intervals of continuous channel resource occupation by a multimedia broadcast multicast service starting from a transmission time interval corresponding to the initial offset time in a time division multiplexing period, or represented by a quantity of system frames of continuous channel resource occupation starting from a system frame corresponding to the initial offset time;

said information of the position and amount of the resource occupied is represented by a time division multiplexing offset bitmap, and a bit of said time division multiplexing offset bitmap corresponds to a transmission time interval in a time division multiplexing repetition period, and a value of the bit represents whether said multimedia broadcast multicast service occupies the transmission time interval corresponding to the bit, and positions of the bits in said bitmap correspond to initial offset times of corresponding transmission time intervals in the repetition period one to one;

said information of the position and amount of the resource occupied is represented by a list of time division multiplexing offsets, and one or more entries of time division multiplexing offsets are included in the list, and said multimedia broadcast multicast service occupies transmission time intervals corresponding to values in all the entries in the list in a time division multiplexing repetition period.

Compared with the prior art, with the method of the present invention, on the basis of inheriting the usage of the current MBMS TDM method in the prior art, the efficiency and flexibility of resource allocation is improved.

BRIEF DESCRIPTION OF THE DRAWING

FIG. 1 is a flow chart of the method for implement time division multiplexing of MBMS services in accordance with an embodiment of the present invention.

PREFERRED EMBODIMENTS OF THE PRESENT INVENTION

In the current method, since the time length of continuous channel resource occupation by a MBMS service in a TDM Rep is not defined, a service can only occupy one TTI starting from its defined TDM Offset in a TDM Rep, that is, only those frames that satisfy one offset are allocated to the service.

If two services with different service rates share the same channel resource by time division multiplexing, obviously the service with higher rate needs to occupy more channel resource, while the service with lower rate only needs to occupy less channel resource. However, with the above mode adopted, if the two services are configured with identical repetition periods of time division multiplexing, they have to occupy the same amount of channel resource; therefore, the resource allocated to the service with higher rate may not be enough, while for the service with lower rate, a waste is caused. But if the two services are configured with different time division multiplexing periods, for example, for service one, the TDM Rep is configured as 2, and TDM Offset is configured as 0, while for service two, the TDM Rep is configured as 4, and TDM Offset is configured as 1, then service one occupies a half of the channel resource, while service two occupies a quarter of the channel resource, and there is another quarter of channel resource being idle and not occupied, and due to the limitation in the current TDM allocation mechanism and method, the idle resource cannot be allocated to service one or service two to use, thus the channel resource is greatly wasted. With regard to this, the present invention proposes an improvement of the current TDM mechanism to improve the efficiency and effectiveness of time division multiplexing of resource.

In a 3G system, when MBMS services adopt the PTM transmission mode, they share physical channel resource by time division multiplexing, and further by defining information of the amount of channel resource occupied by a MBMS service in a TDM Rep, efficient allocation of the channel resource can be achieved.

The present invention will be described in detail in combination with several embodiments.

The First Embodiment

In this embodiment, the method for implementing time division multiplexing among MBMS services comprises the following steps:

Step 110, if said MBMS services adopt the bearer type of point-to-multipoint, and the channel resource is shared by time division multiplexing to transmit the services, the network side informs user equipments of configuration information of the MBMS services with a channel message of the MBMS point-to-multipoint control channel, and sends the MBMS services on the channel resource that satisfies said configuration information; the configuration information comprises information of the repetition period of time division multiplexing, information of the position of the channel resource occupied in a time division multiplexing period, and information of the amount of the channel resource occupied in a time division multiplexing period.

Step 120, after receiving the configuration information, the user equipments receive the MBMS services on the indicated channel resource.

As for step 110, in a 3G system, during the process of sharing physical channel resource by time division multiplexing to send MBMS services, the RNC at the network side fulfill the configuration of the above configuration information according to the requirements of the MBMS services and schedules the services according to the configuration information, and CFN information is carried in a FP frame sent to the base station, and the base station determines the initial system frame number for transmission according to the CFN. In the case that there is only the base station and no RNC (the RNC and the base station are combined into one), there is no FP frame, and the other processing is the same.

The RNC can send time division multiplexing configuration information to UEs via the MCCH channel. However, the present invention is not limited to specific channels for sending and entities to be sent, because in other systems, such as evolution systems like LTE, these channels and entities (accomplished by NodeB) may all change, but the basic scheme of the method of the present invention is still applicable.

When MBMS services share channel resource by time division multiplexing, in a TDM Rep, the amount of channel resource occupied by a MBMS service with higher transmission rate is larger or equal to that of the channel resource occupied by a MBMS service with lower rate. Of course, other principles can be applied in other embodiments, to enable MBMS services with different transmission rates to share the channel resource by time division multiplexing.

The cells defined in time division multiplexing configuration information are shown in Table 1, and in the MBSFN TDM Info List cell of the MBMS Current Cell p-t-m rb Information message, the cell (or referred to as parameter) TDM Rep Length is added.

It can be seen that said TDM Rep Length cell comprises information of the repetition length of continuous channel resource occupation by a MBMS service in a TDM Rep. Said repetition length information is the number of TTIs of continuous channel resource occupation by a MBMS service, that is, in a TDM Rep, a MBMS service occupies the channel resource continuously for a time length starting from the TTI of TDM Offset and with a duration of TTIs of which the number is equal to the repetition length defined by the TDM Rep Length cell.

Said repetition length information may also be the number of system frames (i.e. radio frames) or other equivalent information of continuous channel resource occupation by a MBMS service, and the number of system frames is an integral multiple of N, for example, if N is 4, the number of system frames can be 4, 8, 12, . . . .

The TDM Rep Length cell is an optional item, and by default, in a TDM Rep, the time of channel resource occupation by a MBMS service is one TTI.

When the RNC transmits said MBMS services on the channel resource that satisfies the above configuration information, it schedules the MBMS services for corresponding system frames according to the following formula:

(CFN div $N$)mod TDM_Rep=TDM_Offset+$i$, $i$=0 to TDM_Length−1

Wherein,

N is the length of transmission time interval of the transmission channel carrying MBMS services, in units of the number of 10 ms frames;

TDM_Rep is information of the length of said repetition period;

TDM_Offset is said initial offset time, i.e., information of the position of the resource occupied by said MBMS service in a repetition period;

TDM_Length is information of the number of transmission time intervals continuously occupied by said MBMS service in a repetition period, i.e., information of the amount of channel resource occupied by said MBMS service.

MBMS services with different repetition periods can also multiplex the TTIs in a repetition period, as long as the TTIs allocated to the two services do not conflict.

As for step 120, accordingly, user equipments receive said MBMS services at CFN time points that satisfy the following formula:

(CFN div $N$)mod TDM_Rep=TDM_Offset+$i$, $i$=0 to TDM_Length−1

TABLE 1

| MBSFN TDM Info List (the items underlined are newly added) | | | | | |
|---|---|---|---|---|---|
| Information element/Group name | Need | Multi | Type and reference | Semantics description | Version |
| MBSFN TDM Information List | MP | 1 to <maxMBMSservUnmodif> | | | REL-7 |
| >MBMS short transmission ID | MP | | MBMS Short transmission identity 10.3.9a.10 | | REL-7 |
| >TDM_Rep | MP | | Integer (2 . . . 9) | | REL-7 |
| >TDM_Offset | MP | | Integer (0 . . . 8) | | REL-7 |
| >TDM_Length | OP | | Integer(1 . . . TDM_Rep-1) | | |

It will be illustrated below with an application example. For example, if two MBMS services A and B share the channel resource by time division multiplexing to be transmitted, wherein the rate of service A is M, and the rate of service B is 2M, the optimal resource allocation efficiency can be achieved if the ratio of the channel resource occupied by A to that occupied by B is 1:2. The TDM Rep of A and B is set to 3, and the TTI of the transmission channel is 40 ms, i.e., N=4. According to this embodiment, wherein the value of TDM Length is the number of TTIs of continuous channel resource occupation by a MBMS service, for service A, it is set as TDM Offset=0, TDM Length=1, and for service B, it is set as TDM Offset=1, TDM Length=2. During transmission, in a TDM Rep, the channel resource occupied by service A is all the system frames in the first TTI; and the channel resource occupied by service B is all the system frames in the second and third TTIs.

The Second Embodiment

Steps of the method in this embodiment are similar to those in the first embodiment, and will not be repeated here, and the difference only exists in the specific implementation. In this embodiment, according to the requirements of MBMS services, the RNC adds a group of TDM Offset cells in the time division multiplexing configuration information in the MBSFN TDM Info List cell of the MBMS Current Cell rb Information message.

Said TDM Offset cell is used to represent information of the position and amount of the channel resource occupied by a MBMS service in a TDM Rep. That is, in a TDM Rep, a MBMS service occupies the channel resource during the time defined by the TDM Offset.

Said TDM Offset cell is defined as a group of TDM Offset Bitmap cells, and the cells defined in the configuration information are shown in Table 2.

It can be seen that each bit of the cell represents the value of a TDM Offset in the repetition period, and if the value of the $i^{th}$ bit of the TDM Offset Bitmap of a MBMS service is set to 1 (may also be set to 0, and the effect is the same), the radio resource control entity sends the MBMS service in all the CFNs of all the TTIs satisfying formula (1) in a TDM Rep. And user equipments receive the MBMS service in these CFNs too.

(CFN div $N$)mod TDM_Rep=TDM_Offset,$i$

Wherein, TDM_Offset,i represents the offset value of $i^{th}$ TTI occupied by said MBMS service in a repetition period, and the value of i is determined by the position of the bit set to 1 in the TDM Offset Bitmap (or other value representing the status of occupied).

This will be illustrated with an application example too. For example, if two MBMS services A and B share the channel resource by time division multiplexing to be transmitted, wherein the rate of service A is M, and the rate of service B is 2M, the optimal resource allocation efficiency can be achieved if the ratio of the channel resource occupied by A to that occupied by B is 1:2. The TDM Rep is set to 3, the system frame is 10 ms frame, and the TTI of the transmission channel is 40 ms, i.e., N=4.

According to this embodiment, if the TDM Offset Bitmap is defined, the TDM Offset Bitmap of service A is set to the binary value of 000000010, that is, the second bit of the cell is set to 1, and the other bits are set to 0; the TDM Offset Bitmap of service B is set to the binary value of 000000101, that is, the first and third bits of the cell are set to 1, and the other bits are set to 0. Valid bits in the 9 bits, such as 3 bits, are appointed by user equipments and the network side. Therefore, in a TDM Rep, the channel resource occupied by service A is all the 10 ms frames in the second TTI; the channel resource occupied by service B is all the 10 ms frames in the first and third TTIs.

In other embodiments, said TDM Offset cell may also be defined as a list of TDM Offsets, and as shown in Table 3, the cell of TDM Offset List is defined, and the cell comprises one or more entries of TDM_Offsets, values of which are integers, representing the positions of one or more TTIs of resource occupation in a TDM_Rep.

TABLE 2

MBSFN TDM Info List (items underlined are newly added)

| Information element/Group name | Need | Multi | Type and reference | Semantics description | Version |
|---|---|---|---|---|---|
| MBSFN TDM Information List | MP | 1 to <maxMBMSservUnmodif> | | | REL-7 |
| >MBMS short transmission ID | MP | | MBMS Short transmission identity 10.3.9a.10 | | REL-7 |
| >TDM_Rep | MP | | Integer (2 ... 9) | | REL-7 |
| >TDM_Offset_Bitmap | MP | | Bitstring (9) | | REL-7 |

TABLE 3

MBSFN TDM Info List (items underlined are newly added)

| Information element/Group name | Need | Multi | Type and reference | Semantics description | Version |
|---|---|---|---|---|---|
| MBSFN TDM Information List | MP | 1 to <maxMBMSservUnmodif> | | | REL-7 |
| >MBMS short | MP | | MBMS | | REL-7 |

TABLE 3-continued

MBSFN TDM Info List (items underlined are newly added)

| Information element/Group name | Need | Multi | Type and reference | Semantics description | Version |
|---|---|---|---|---|---|
| transmission ID | | | Short transmission identity 10.3.9a.10 | | |
| >TDM_Rep | MP | | Integer (2 . . . 9) | | REL-7 |
| TDM_Offset_List | MP | 1 to <TDM_Rep> | | | |
| >TDM_Offset | MP | | Integer(0 . . . TDM_Rep-1) | | REL-7 |

A MBMS service occupies the channel resource in all the CFNs of all the TTIs satisfying the following formula in a TDM Rep. In addition, the network side sends the MBMS service on this channel resource, and user equipments receive the MEMS on this channel resource.

(CFN div $N$)mod TDM_Rep=TDM_Offset,$i$

Wherein TDM_Offset,$i$ is the value of the $i^{th}$ entry in the TDM Offset List of the service, and its value range is shown in Table 3.

This will be illustrated below with an application example too. For example, if two MBMS services A and B share the channel resource by time division multiplexing to be transmitted, wherein the rate of service A is M, and the rate of service B is 2M, the optimal resource allocation efficiency can be achieved if the ratio of the channel resource occupied by service A to that occupied by service B is 1:2. The TDM Rep is set to 3, the system frame is 10 ms frame, and the TTI of the transmission channel is 40 ms, i.e., N=4.

If the TDM Offset cell is a list of TDM Offsets, the TDM Offset List of service A is set including one entry, of which the value is 2, and the TDM Offset List of service B is set including two entries, of which the values are respectively 1, 3. Therefore, in a TDM Rep, it can also be implemented that the channel resource occupied by service A is all the 10 ms frames in the second TTI; the channel resource occupied by service B is all the 10 ms frames in the first and third TTIs.

I claim:

1. A method for implementing time division multiplexing of multimedia broadcast multicast services from a network side to user equipments, comprising:
determining, by said network side, if broadcast multicast services adopt a bearer type of point-to-multipoint, and channel resource is shared by time division multiplexing to transmit the services;
when the multimedia broadcast multicast services adopt a bearer type of point-to-multipoint, and channel resource is shared by time division multiplexing to transmit the services, said network side informing said user equipments of configuration information of the multimedia broadcast multicast services, and sending said multimedia broadcast multicast services on the channel resource satisfying said configuration information, the configuration information comprising information of a time division multiplexing repetition period, and information of a position and amount of channel resource occupied by multimedia broadcast multicast services transmission in a time division multiplexing period;
after receiving said configuration information, said user equipments receiving said multimedia broadcast multicast services on indicated channel resource corresponding to said amount of channel resource.

2. A method of claim 1, wherein, said information of the position of the channel resource occupied refers to information of an offset of a transmission time interval of the channel resource occupied by said multimedia broadcast multicast services in a time division multiplexing period, and said information of the amount of the channel resource occupied refers to a quantity of system frames or transmission time intervals of the channel resource occupied by said multimedia broadcast multicast services in a repetition period.

3. A method of claim 2, wherein, said information of the amount of the channel resource occupied is information of a time division multiplexing repetition length, represented by a quantity of transmission time intervals of continuous channel resource occupation by a multimedia broadcast multicast service starting from a transmission time interval corresponding to an initial offset time representing the position of the channel resource occupied in a time division multiplexing period, or represented by a quantity of system frames of continuous channel resource occupation starting from a system frame corresponding to the initial offset time.

4. A method of claim 3, further comprising: when sending said multimedia broadcast multicast services on the channel resource satisfying said configuration information, the network side scheduling the multimedia broadcast multicast services for corresponding system frames according to the following equation, and accordingly, said user equipments also receiving said multimedia broadcast multicast services on the system frames satisfying the following equation:

(CFN div $N$)mod TDM_Rep=TDM_Offset+$i$, $i$=0 to TDM_Length−1 wherein,
CFN is a connection frame number of a system frame;
N is a length of a transmission time interval of a transmission channel bearing the multimedia broadcast multicast services, that is, a quantity of system frames included in a transmission time interval;
(CFN div N) is an aliquot arithmetic expression, representing rounding down;
TDM_Rep is information of a length of said repetition period;
TDM_Offset is said initial offset time, that is, the information of the position of the channel resource occupied by said multimedia broadcast multicast services in a repetition period;
TDM_Length is information of a quantity of transmission time intervals continuously occupied by said multimedia broadcast multicast services in a repetition period, and also the information of the amount of the channel resource occupied by said multimedia broadcast multicast services.

5. A method of claim 4, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

6. A method of claim 3, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

7. A method of claim 2, wherein, said information of the position and amount of the channel resource occupied is represented by a time division multiplexing offset bitmap, and a bit of said time division multiplexing offset bitmap corresponds to a transmission time interval in a time division multiplexing repetition period, and a value of the bit represents whether said multimedia broadcast multicast services occupy the transmission time interval corresponding to the bit, and positions of bits in said bitmap correspond to initial offset times of corresponding transmission time intervals in the repetition period one to one.

8. A method of claim 7, further comprising:
when sending said multimedia broadcast multicast services on the channel resource satisfying said configuration information, the network side scheduling the multimedia broadcast multicast services for corresponding system frames according to the following equation, and accordingly, said user equipments also receiving said multimedia broadcast multicast services on the system frames satisfying the following equation:

$$(CFN \text{ div } N) \bmod TDM\_Rep = TDM\_Offset, i$$

wherein,
CFN is a connection frame number of a system frame;
N is a length of a transmission time interval of a transmission channel bearing the multimedia broadcast multicast services, that is, a quantity of system frames included in a transmission time interval;
(CFN div N) is an aliquot arithmetic expression, representing rounding down;
TDM_Rep is information of a length of the repetition period;
TDM_Offset,i represents an offset value of an $i^{th}$ transmission time interval occupied by said multimedia broadcast multicast services in a repetition period, and a value of i is determined by a position of a bit set to a value representing an occupied status in the time division multiplexing offset bitmap.

9. A method of claim 8, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

10. A method of claim 7, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

11. A method of claim 2, wherein, said information of the position and amount of the channel resource occupied is represented by a list of time division multiplexing offsets, and one or more entries of time division multiplexing offsets are included in the list, and said multimedia broadcast multicast services occupy transmission time intervals corresponding to values in all the entries in the list in a time division multiplexing repetition period.

12. A method of claim 11, further comprising: when sending said multimedia broadcast multicast services on the channel resource satisfying said configuration information, the network side scheduling the multimedia broadcast multicast services for corresponding system frames according to the following equation, and accordingly, said user equipments also receiving said multimedia broadcast multicast services on the system frames satisfying the following equation:

$$(CFN \text{ div } N) \bmod TDM\_Rep = TDM\_Offset, i$$

wherein,
CFN is a connection frame number of a system frame;
N is a length of a transmission time interval of a transmission channel bearing the multimedia broadcast multicast services, that is, a quantity of system frames included in a transmission time interval;
(CFN div N) is an aliquot arithmetic expression, representing rounding down;
TDM_Rep is information of a length of the repetition period;
TDM_Offset,i represents a value of an $i^{th}$ entry in the list of time division multiplexing offsets of said multimedia broadcast multicast services.

13. A method of claim 2, wherein, by default, said information of the amount of the channel resource occupied indicates that time of channel resource occupation by a multimedia broadcast multicast service in a time division multiplexing period is one transmission time interval.

14. A method of claim 2, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

15. A method of claim 1, wherein, said configuration information is sent to the user equipments through a Multimedia Broadcast Multicast Service Current Cell point-to-multipoint radio bearer Information message of a Multimedia Broadcast Multicast Service point-to-multipoint control channel, or a Multimedia Broadcast Multicast Service Common point-to-multipoint radio bearer Information message, or a Multimedia Broadcast Multicast Service Single Frequency Network Time Division Multiplexing Information List cell, that is, a MBSFN TDM Info List cell, in a Multimedia Broadcast Multicast Service General Information message.

16. A method for transmitting time division multiplexing information in multimedia broadcast multicast services from a network side to user equipments, comprising:
    determining, by the network side, if the network side adopts a bearer type of point-to-multipoint and transmits the multimedia broadcast multicast services by sharing channel resource with time division multiplexing;
    when said network side adopts a bearer type of point-to-multipoint and transmits the multimedia broadcast multicast services by sharing channel resource with time division multiplexing, the network side sending said user equipments configuration information of said multimedia broadcast multicast services which includes information of a time division multiplexing repetition period, information of a position and an amount of channel resource occupied by multimedia broadcast multicast services transmission in a time division multiplexing period;
    after receiving said configuration information, said user equipments receiving said multimedia broadcast multicast services on indicated channel resource corresponding to said amount of channel resource.

17. A method of claim 16, further comprising: a radio network controller of said network side informing the user equipments of the configuration information of said multimedia broadcast multicast services through a channel message of a Multimedia Broadcast Multicast Service point-to-multipoint control channel.

18. A method of claim 16, wherein, the information of the amount of the channel resource occupied and the information of the position of the channel resource occupied in said configuration information are represented in one of the following modes:
    said information of the position of the channel resource occupied is represented by an initial offset time, and said information of the amount of the channel resource occupied is represented by a time division multiplexing repetition length, that is, represented by a quantity of transmission time intervals of continuous channel resource occupation by a multimedia broadcast multicast service starting from a transmission time interval corresponding to the initial offset time in a time division multiplexing period, or represented by a quantity of system frames of continuous channel resource occupation starting from a system frame corresponding to the initial offset time;
    said information of the position and amount of the channel resource occupied is represented by a time division multiplexing offset bitmap, and a bit of said time division multiplexing offset bitmap corresponds to a transmission time interval in a time division multiplexing repetition period, and a value of the bit represents whether said multimedia broadcast multicast service occupies the transmission time interval corresponding to the bit, and positions of bits in said bitmap correspond to initial offset times of corresponding transmission time intervals in the repetition period one to one;
    said information of the position and amount of the channel resource occupied is represented by a list of time division multiplexing offsets, and one or more entries of time division multiplexing offsets are included in the list, and said multimedia broadcast multicast services occupy transmission time intervals corresponding to values in all the entries in the list in a time division multiplexing repetition period.

* * * * *